United States Patent [19]

Knudsen

[11] 4,202,596
[45] May 13, 1980

[54] CENTER PIVOT IRRIGATION SYSTEM WITH SLINGER-TYPE SPRINKLER MEANS

[76] Inventor: Leland F. Knudsen, 303 S. 17th St., Norfolk, Nebr. 68701

[21] Appl. No.: 864,261

[22] Filed: Dec. 27, 1977

[51] Int. Cl.$^2$ .............................................. B05B 3/12
[52] U.S. Cl. ................................ 239/177; 137/513.7; 138/46; 239/224; 239/570
[58] Field of Search .................. 138/45, 46; 137/513.3, 137/513.5, 513.7; 239/177, 212, 214, 222.11, 223, 224, 570

[56] References Cited

U.S. PATENT DOCUMENTS

| | | | |
|---|---|---|---|
| 447,778 | 3/1891 | Kisinger | 239/224 |
| 1,833,497 | 11/1931 | Prouty | 239/214 X |
| 2,255,157 | 9/1941 | Friend et al. | 239/224 |
| 2,962,046 | 11/1960 | Bochan | 137/513.5 |
| 3,720,374 | 3/1973 | Ross | 239/212 X |

Primary Examiner—Andres Kashnikow
Attorney, Agent, or Firm—Clarence A. O'Brien; Harvey B. Jacobson

[57] ABSTRACT

A mobile irrigation system of the type including an elongated horizontal water conduit assembly having support structure spaced therealong for support from and movement over the ground is provided. One end of the water conduit assembly may be communicated with a source of water under low pressure and a plurality of discharge pipes are supported from the assembly at points spaced therealong and open upwardly and outwardly from the interior of the conduit assembly. A plurality of motor driven generally horizontal and centrally apertured discs are journaled from the assembly and the discharge pipes project upwardly through the central apertures in the discs. The upper end portions of the discharge pipes include generally horizontal outwardly opening outlet portions for discharging low pressure water outwardly onto the upper surface of the disc outwardly of the central apertures thereof and the disc includes upstanding water slinger vanes spaced thereabout for engaging and angularly accelerating the water discharged onto the discs upon rotation of the latter. The outer ends of the vanes are contoured to discharge the accelerated water therefrom at high velocity.

7 Claims, 7 Drawing Figures

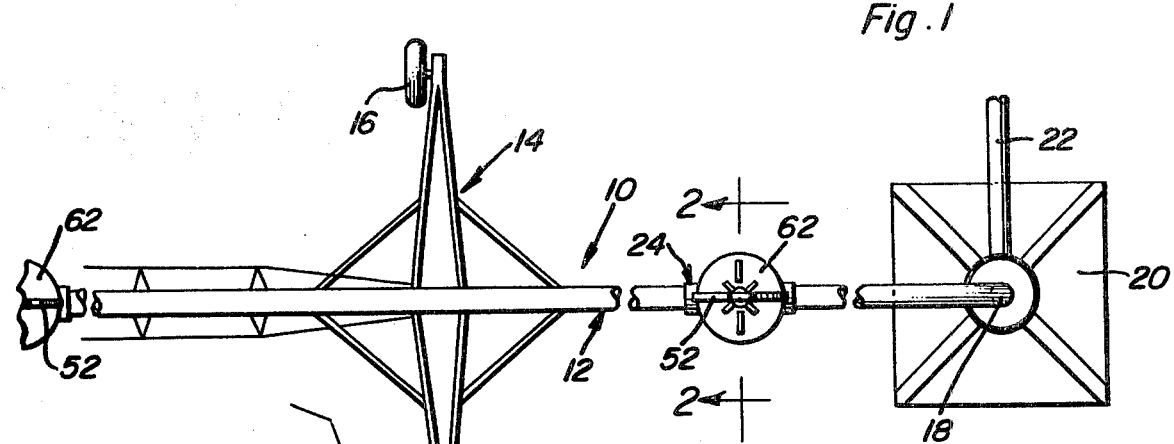
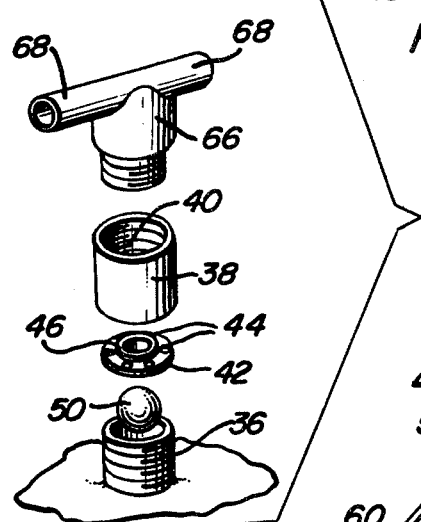
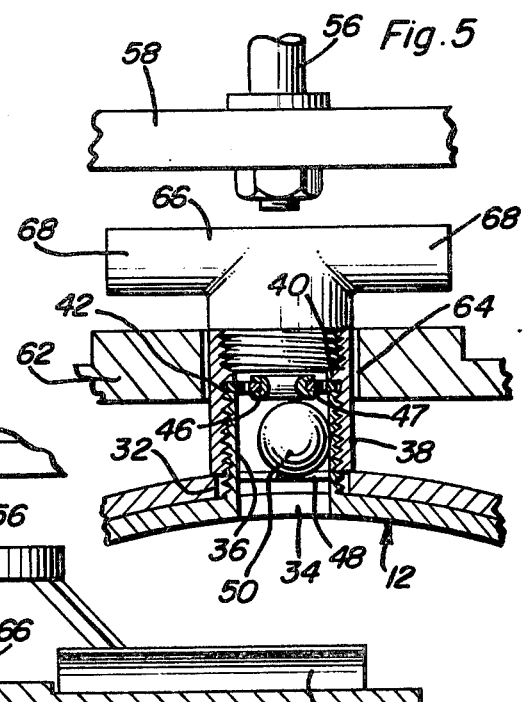
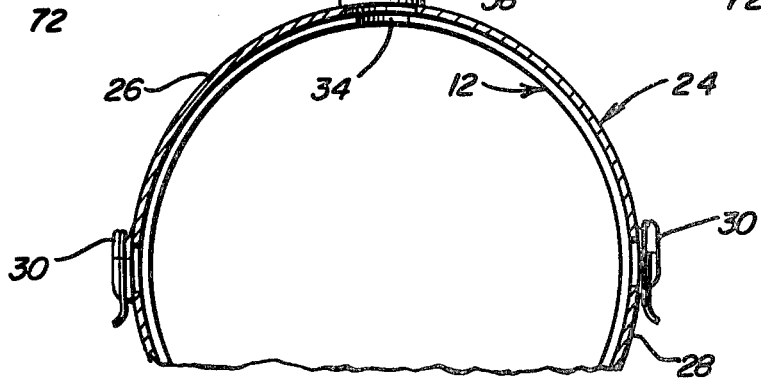

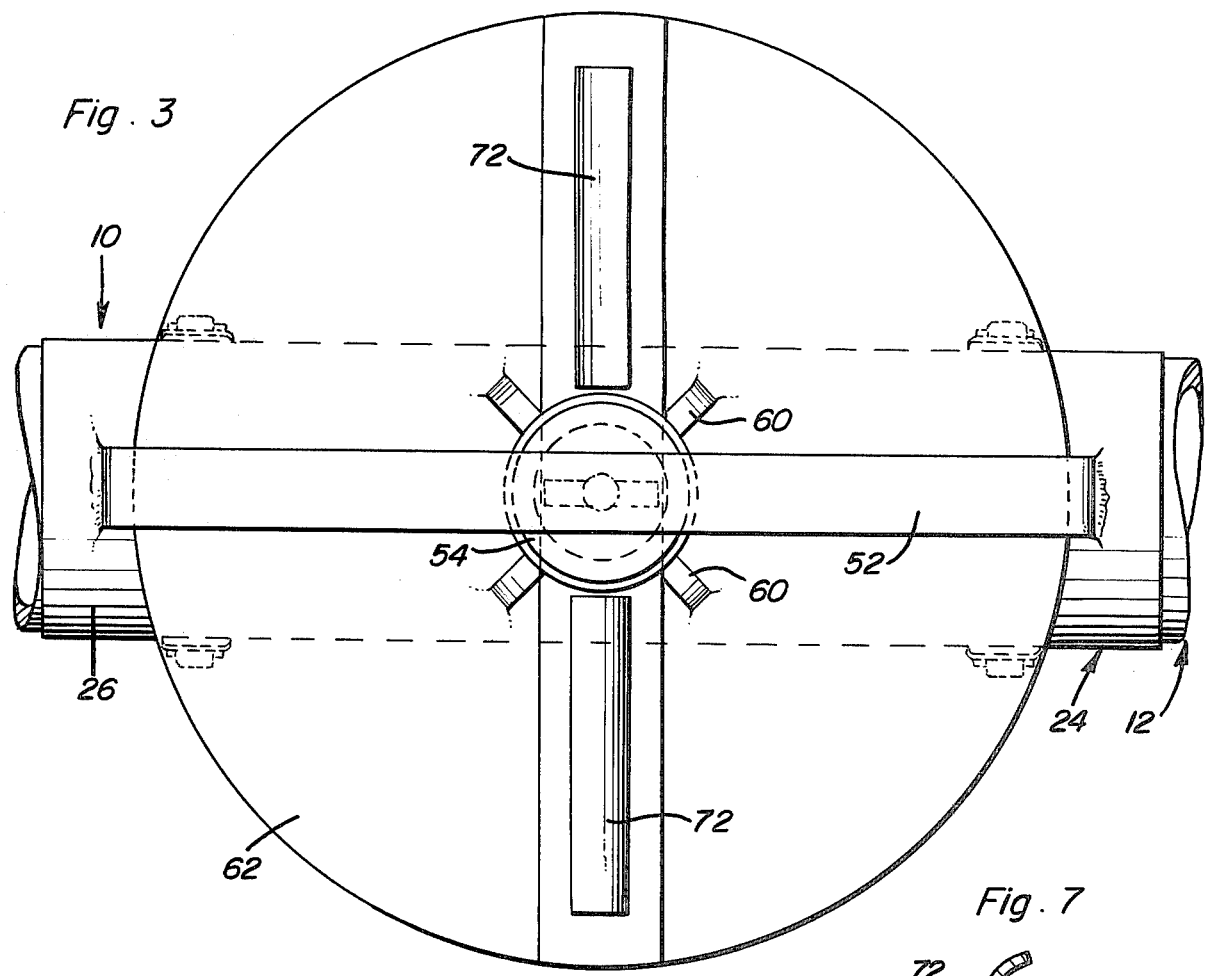
Fig. 3
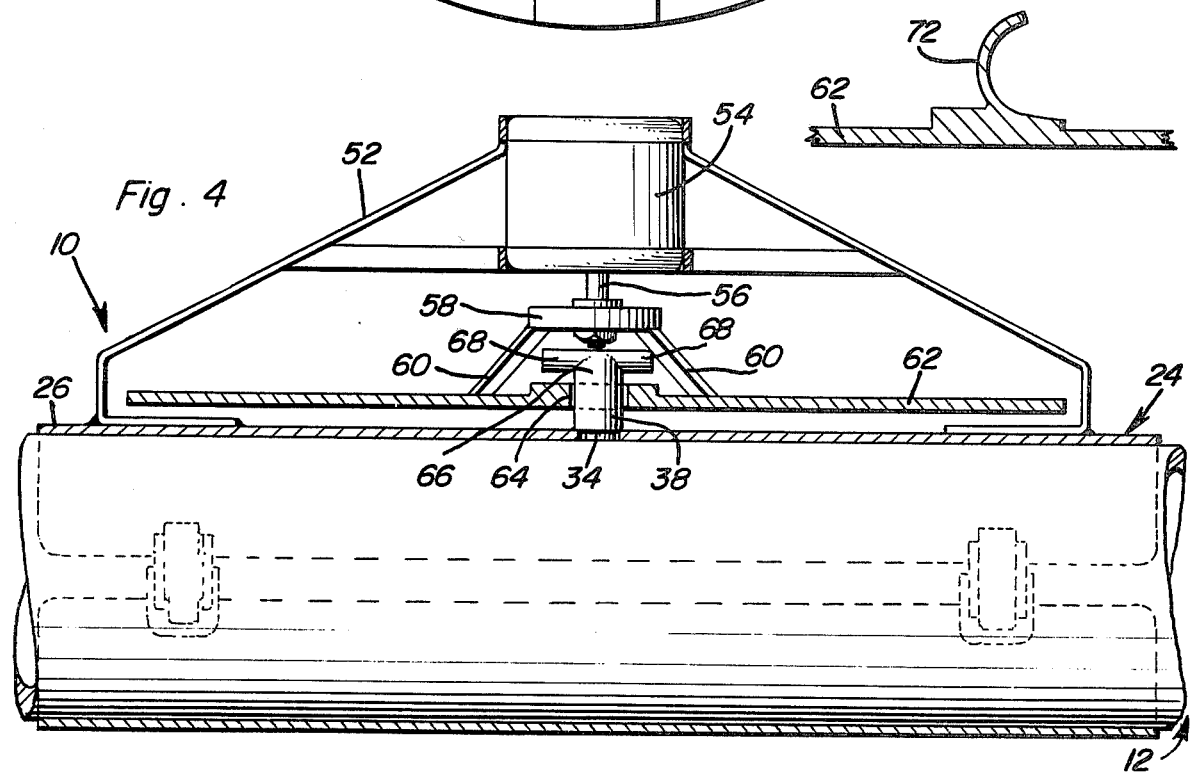
Fig. 7
Fig. 4

CENTER PIVOT IRRIGATION SYSTEM WITH SLINGER-TYPE SPRINKLER MEANS

BACKGROUND OF THE INVENTION

Various forms of irrigation systems using laterally advanceable overhead horizontal water conduits are provided with large amounts of water under high pressure and the conduits include spray heads spaced therealong from which the water within the conduits may be sprayed for irrigation purposes. These types of irrigation systems require the use of high power consuming pumps inasmuch as a large volume of water must be provided and the water within the conduit must be maintained at relatively high pressures in order to enable the spray heads supported therefrom to discharge water considerable distances. In order to provide sufficient power to drive the high volume and high pressure pumps required in irrigation systems of this type, high powered diesel engines are often utilized as motive sources. However, the increased cost of diesel fuel and manufacturing and maintenance costs associated with diesel engines has in recent years made the cost of irrigating crops too expensive for all but the larger farms. Accordingly, a need exists for a less expensive means of irrigating crops through the utilization of mobile irrigation systems.

Therefore, there is disclosed hereinafter a mobile irrigation system to which a large volume of water is provided under low pressure and each spray head location of the irrigation system utilizes an electric motor driven horizontal disc upon the center portion of which irrigation water is discharged and the disc includes upwardly projecting and generally radially extending slinger-type vanes whereby the motive force to project water from each spray head is obtained directly from the associated electric motor. In this manner, relatively inexpensive electric power may be utilized to effect the spray discharge water over relatively great distances.

Examples of slinger-type liquid discharge devices including some of the general structural and operational features of the instant invention are disclosed in U.S. Pat. Nos. 2,756,100, 2,939,636, 2,945,627, 2,994,482, 3,288,052 and 3,934,812.

BRIEF DESCRIPTION OF THE INVENTION

The irrigation system of the instant invention utilizes an overhead water conduit including a plurality of upwardly and outwardly opening outlet pipes spaced therealong and each outlet pipe has a motor driven generally horizontal and centrally apertured disc journaled therefrom with the discharge pipe projecting upwardly through the center aperture of the disc and being provided with a horizontally outwardly opening discharge portion for discharging water onto the upper surface of the disc at low pressure outwardly of the center aperture in the disc. The disc includes upstanding and generally radially projecting slinger-type vanes and the vanes engage the water discharged onto the upper surface of the disc and angularly accelerate the water in order that it may be slung from the outer periphery of the disc at high velocity.

Further, each discharge pipe provided on the water conduit includes water flow throttling structure whereby the flow of water therethrough may be adjusted as desired in order to reduce the flow of water therethrough in the event that particular location of the irrigation system is expected to operate at a lower elevation than other portions of the irrigation system, the utilization of low water pressure in the water conduit necessitating the restriction of water flow from the depressed portions thereof.

The main object of this invention is to provide a mobile irrigation system which may be more economically powered.

Another object of this invention is to provide a mobile irrigation system including individual electric motor driven slinger-type structures in conjunction with a low water pressure supply for causing water to be sprayed from the irrigation system over great distances.

Another object of this invention is to provide an irrigation system constructed in accordance with the preceding objects and in a manner whereby the spray head locations thereon may be selected as desired and selectively rendered inoperative, if desired.

A final object of this invention to be specifically enumerated herein is to provide a irrigation system in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of an irrigation system of the mobile type constructed in accordance with the present invention;

FIG. 2 is a fragmentary enlarged vertical sectional view taken substantially upon the plane indicated by the section line 2—2 of FIG. 1;

FIG. 3 is an enlarged fragmentary top plan view of a spray head location of the irrigation system;

FIG. 4 is a fragmentary, vertical sectional view taken substantially upon the plane passing longitudinally through the portion of the irrigation system illustrated in FIG. 3;

FIG. 5 is an enlarged fragmentary vertical sectional view illustrating the manner in which a discharge pipe portion of the irrigation system projects centrally upwardly through the associated rotary disc portion;

FIG. 6 is an exploded perspective view of one of the discharge pipe portions of the instant invention; and FIG. 7 is a fragmentary, vertical sectional view illustrating one of the slinger vane equipped portions of a motor driven disc of the system.

DETAILED DESCRIPTION OF THE INVENTION

Referring now more specifically to the drawings, the numeral 10 generally designates the irrigation system of the instant invention. The irrigation system 10 includes an elongated horizontal water conduit assembly referred to in general by the reference numeral 12 and including a plurality of support tower assemblies referred to in general by the reference numerals 14 spaced therealong. Each of the support tower assemblies includes support wheels 16 and the wheels 16 may be driven from any suitable source of power. The water conduit assembly 12 includes an inlet end 18 supported from a center pivot assembly 20 and the support tower assemblies 14 drive the water conduit assembly 12 about the center pivot assembly 20.

Any suitable controls may be utilized to maintain the water conduit assembly 12 substantially straight and water is supplied to the center pivot assembly 20 through a supply pipe 22 from a suitable source (not shown) of high volume low pressure water. Therefore, it may be seen that the irrigation system 10 is similar in general structure and operation to conventional center pivot irrigation systems, except that water supplied thereto is supplied under low pressure as opposed to high pressure.

In a conventional center pivot irrigation system, the water conduit assembly 12 is provided with spray heads at points spaced therealong from which water is sprayed under high pressure. These types of irrigation systems require high powered motors to drive high capacity and high pressure pumps in order to supply sufficient volumes of water under sufficiently high pressure to the water conduit assemblies thereof.

The water conduit assembly 12 of the instant invention has a plurality of saddle assemblies referred to in general by the reference numeral 24 secured thereto at points spaced therealong. Each saddle assembly 24 includes a downwardly opening upper saddle section 26 and a lower upwardly opening saddle section 28. The saddle sections 26 and 28 of each saddle assembly 24 are clamped about the corresponding water conduit assembly portion by means of clamp assemblies 30. The clamp assemblies 30 releasably clamp the saddle assemblies 24 about the water conduit assembly 12 and each upper saddle section 26 includes an upper opening 32 therein. The saddle assemblies 24 are secured to the water conduit assembly 12 in position with the opening 32 registered with openings 34 opening upwardly and outwardly from the water conduit assembly 12, the latter being constructed of a plurality of end aligned pipe sections removably coupled together.

The water conduit assembly 12 has a plurality of externally threaded upwardly projecting outlet nipples 36 secured thereto in registry with the openings 34 and an internally threaded sleeve 38 including an inner circumferentially extending shoulder 40 is threadedly engaged over each of the nipples 36 with a water flow throttling disc 42 secured over the upper end of each nipple 36 and held captive beneath the corresponding shoulder 40.

It may be seen from FIG. 6 of the drawings that each disc 42 includes a plurality of circumferentially spaced apertures 44 formed through its outer peripheral portion and that a seat defining angular seal 46 is secured in a central opening 47 formed through the disc 42. The lower portion of the nipple 36 includes a cruciform valve element retainer 48 and a spherical valve member 50 is disposed in each nipple 36 above the valve retainer 48 and below the corresponding disc 42 for a purpose to be hereinafter more fully set forth.

The upper saddle sections 26 each mount an upper support frame 52 therefrom and each support frame 52 supports an electric motor 54 having a downwardly directed rotary output shaft 56. A drive disc 58 is mounted on each shaft 56 and a plurality of downwardly divergent braces 60 depend from peripherally spaced outer marginal portions of the disc 58 and the lower ends of the braces 60 are secured to a horizontal disc 62 centrally apertured as at 64. The sleeve 38 extends upwardly through the central aperture 64 formed in the disc 62 and an externally threaded T-fitting 66 is threaded down into the upper end of the sleeve 38 above the shoulder 40 and includes a pair of upper horizontally outwardly opening discharge ends 68 disposed outwardly of the central aperture 64.

In operation, water is supplied to the water conduit assembly 12 through the supply pipe 22 and the center pivot assembly 20 and the support tower assemblies 14 drive the water conduit assembly 12 about the center pivot assembly 20 in a controlled manner. The water supplied to the water conduit assembly 12 is supplied thereto under low pressure and the low pressure water within the water conduit assembly 12 is discharged upwardly through the openings 34, the nipples 36 and into the T-fittings 66 for discharge therefrom outwardly over the upper surfaces of the discs 62. The discs 62 are driven at high speed by the motors 54 and include generally radial upstanding slinger-type vanes 72 which engage the water discharged onto the upper surface of the discs 62 and angularly accelerate the water whereby the latter is discharged from the radial outermost ends of the vanes 72 at high speed. Thus, each of the slinger-type discs 62 provide substantially all of the motive force for discharging water therefrom at high speeds and the motors 54 may be driven electrically at a relatively low cost while water supplied to the system 10 is provided at a low pressure thus saving the expense of purchasing, operating and maintaining high pressure water systems.

If it is desired, the saddle assemblies 24 may be added or deleted from the water conduit assembly 12 as desired. If a saddle assembly 24 is removed from one spray location, the associated sleeve 38, disc 42 and T-fittings 66 are also removed and the nipple 36 may be capped.

If one of the spray locations is expected to traverse depressed land, it is apparent that water pressure in that portion of the water conduit assembly 12 will be higher than water pressure in more elevated portions of the water conduit 12. However, the higher water pressure in such depressed portions of the water conduit assembly 12 causes additional water flow through the associated nipple 36 and thereby causes the valve member 50 to be elevated into seated engagement with the corresponding angular seat 46. Therefore, excess water flow to one of the T-fittings 66 because of its being carried by a depressed portion of the water conduit assembly 12 will be automatically throttled to conserve water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mobile irrigation system including an elongated horizontal water conduit assembly including support means spaced therealong adapted to be engaged with and to be advanced over the ground for support of said assembly from the ground and lateral advancement thereover, one end of said assembly being adapted for communication with a source of water under low pressure, a plurality of discharge pipes supported from said assembly at points spaced therealong and opening upwardly and outwardly from the interior of said conduit assembly, a plurality of motor driven generally horizontal and centrally apertured discs journalled from said assembly and upwardly through whose central apertures said discharge pipes project for discharging low pressure water outwardly onto the upper surfaces of said discs outwardly of said central apertures, said discs including upstanding water slinger vanes spaced thereabout for engaging and angularly accelerating the water discharged onto said discs, said vanes including outer end portions from which the accelerated water may be discharged at high velocity, said conduit assembly including a plurality of pipe saddles mounted thereon upwardly through which said discharge pipes project, each of said saddles supporting a motor therefrom above said conduit assembly, each of said motors including a downwardly directed rotary output shaft, said discs being mounted on said output shafts for rotation therewith.

2. The combination of claim 1 wherein each of said discharge pipes includes readily changeable water throttling means operatively associated therewith for variably throttling the flow of low pressure water therethrough.

3. The combination of claim 1 wherein the upper end portions of said discharge pipes are removably supported from the lower end portions thereof and comprise T-fittings.

4. The combination of claim 3 wherein each of said discharge pipes includes readily changeable water throttling means operatively associated therewith for variably throttling the flow of low pressure water therethrough.

5. A mobile irrigation system including an elongated horizontal water conduit assembly including support means spaced therealong adapted to be engaged with and to be advanced over the ground for support of said assembly from the ground and lateral advancement thereover, one end of said assembly being adapted for communication with a source of water under low pressure, a plurality of discharge pipes supported from said assembly at points spaced therealong and opening upwardly and outwardly from the interior of said conduit assembly, a plurality of motor driven generally horizontal and centrally apertured discs journalled from said assembly and upwardly through whose central apertures said discharge pipes project for discharging low pressure water outwardly onto the upper surfaces of said discs outwardly of said central apertures, said discs including upstanding water slinger vanes spaced thereabout for engaging and angularly accelerating the water discharged onto said discs, said vanes including outer end portions from which the accelerated water may be discharged at high velocity, the upper end portions of said discharge pipes being removably supported from the lower end portions thereof and comprise T-fittings, each of said discharge pipes including readily changeable water throttling means operatively associated therewith for variably throttling the flow of low pressure water therethrough, said water throttling means being removably supported from said discharge pipes by said T-fittings and may be readily replaced upon removal of said T-fittings.

6. The combination of claim 5 wherein said water throttling means comprise apertured water flow controlling discs removably supported in said discharge pipes.

7. A mobile irrigation system including an elongated horizontal water conduit assembly including support means spaced therealong adapted to be engaged with and to be advanced over the ground for support of said assembly from the ground and lateral advancement thereover, one end of said assembly being adapted for communication with a source of water under low pressure, a plurality of discharge pipes supported from said assembly at points spaced therealong and opening upwardly and outwardly from the interior of said conduit assembly, a plurality of motor driven generally horizontal and centrally apertured discs journalled from said assembly and upwardly through whose central apertures said discharge pipes project for discharging low pressure water outwardly onto the upper surfaces of said discs outwardly of said central apertures, said discs including upstanding water slinger vanes spaced thereabout for engaging and angularly accelerating the water discharged onto said discs, said vanes including outer end portions from which the accelerated water may be discharged at high velocity, said conduit assembly including a plurality of pipe saddles mounted thereon upwardly through which said discharge pipes project, each of said saddles supporting a motor therefrom above said conduit assembly, each of said motors including a downwardly directed rotary output shaft, said discs being mounted on said output shafts for rotation therewith, said saddles being removably supported from said conduit assembly.

* * * * *